UNITED STATES PATENT OFFICE.

GEORGE WITTY, OF SCRANTON, PENNSYLVANIA, ASSIGNOR OF ONE-HALF TO STEPHEN S. SPRUKS, OF SCRANTON, PENNSYLVANIA.

WALL-PLASTERING.

1,073,008.     Specification of Letters Patent.     Patented Sept. 9, 1913.

No Drawing.     Application filed June 7, 1912. Serial No. 702,281.

*To all whom it may concern:*

Be it known that I, GEORGE WITTY, a citizen of the United States of America, residing at Scranton, in the county of Lackawanna and State of Pennsylvania, have invented new and useful Improvements in Wall-Plastering, of which the following is a specification.

This invention relates to improvements in wall plaster or coating and has particular application to what is commonly known as the sub-plaster for receiving the surface coating.

In carrying out the present invention, it is my purpose to provide a plaster which may be applied to a wall, ceiling or the like in a relatively short time as compared with the time now consumed in applying the sub-coating or plaster and which will be waterproof, fireproof and frost-proof. Furthermore, I aim to provide a sub-plaster or coating which will be relatively light, as compared with the weight of the plaster now in use, so that the laths will not be subjected to excessive weight, thereby prolonging the life of the wall or ceiling as a whole.

It is also my purpose to provide a sub-coating or plaster for walls or the like, which will dry out quickly so that the surface coating may be applied without the necessity of waiting several days for the sub-coating to dry.

With the above and other objects in view, the invention consists in the combination of elements hereinafter set forth in and falling within the scope of the claim.

In carrying my invention into practice, I utilize or employ a number of elements which will readily and effectively mix with one another or commingle so that the plaster or coating is obtained in a minimum length of time. Furthermore, these elements when commingled or mixed together produce a plaster of relatively great covering capacity, capable of being worked with ease and facility and when once applied will not "drop" or leave the wall. In order to obtain this plaster, I make use of hydrate of lime approximately fifty per cent. (50%), burnt clay thirty per cent. (30%), and silicate of alumina twenty per cent. (20%). Previous to mixing these elements, the clay is burned to a clinker and subsequently powdered or pulverized to a palpable mass capable of readily and effectively commingling with the hydrate of lime and silicate of alumina.

In practice, I have found that the resultant plastic mass when applied to the wall, ceiling or the like, eliminates the necessity of employing the common water brush and may be leveled by a suitable instrument such, for example, as a float or rod and does not drop off or leave the wall while being leveled, or when settling. Consequently, there is no waste.

From the foregoing description, it will be seen that I have provided a sub-plaster or coating for walls, ceilings and the like which is much lighter than any other plaster heretofore used and one which may be easily and effectively worked and which, when once applied, will dry in a relatively short period of time.

I claim:

A wall plaster or coating which consists of hydrate of lime 50%, burnt clay 30% and silicate of aluminum 20%.

In testimony whereof I affix my signature in presence of two witnesses.

GEORGE WITTY.

Witnesses:
   JOHN J. McCARTHY,
   BENNETT S. JONES.